US007191506B2

(12) United States Patent
Gray et al.

(10) Patent No.: US 7,191,506 B2
(45) Date of Patent: Mar. 20, 2007

(54) METHOD OF INSTALLING AN ELECTRONIC DISPLAY DEVICE ON A VEHICLE

(75) Inventors: James Earl Gray, Richardson, TX (US); John Bartholomew Gunter, Flower Mound, TX (US)

(73) Assignee: Luminator Holding LLP, Plano, TX (US)

( * ) Notice: Subject to any disclaimer, the term of this patent is extended or adjusted under 35 U.S.C. 154(b) by 0 days.

(21) Appl. No.: 10/903,428

(22) Filed: Jul. 30, 2004

(65) Prior Publication Data

US 2005/0000126 A1 Jan. 6, 2005

Related U.S. Application Data

(62) Division of application No. 10/385,820, filed on Mar. 10, 2003.

(51) Int. Cl.
*B23P 11/00* (2006.01)
*G09F 3/04* (2006.01)

(52) U.S. Cl. ...................... 29/525.1; 452/452; 452/591

(58) Field of Classification Search ............. 29/525.01, 29/525.1; 40/452, 591, 605, 606.14, 607.13
See application file for complete search history.

(56) References Cited

U.S. PATENT DOCUMENTS 3,152,416 A * 10/1964 Maclean ...................... 40/592
3,593,448 A 7/1971 Schoeph et al.
4,154,504 A * 5/1979 Mohs ......................... 359/514
4,592,530 A 6/1986 Seely et al.
4,698,928 A 10/1987 Soporowski
4,899,973 A 2/1990 Ishida et al.
5,138,523 A 8/1992 Benck et al.
5,452,188 A * 9/1995 Green et al. ................ 362/493
5,504,653 A 4/1996 Murphy et al.
5,585,783 A 12/1996 Hall
5,636,462 A 6/1997 Kleiman
5,743,509 A 4/1998 Kanda et al.
5,782,094 A 7/1998 Freeman
5,857,767 A 1/1999 Hochstein
6,050,013 A 4/2000 Heaton et al.
6,106,912 A * 8/2000 Balog .......................... 428/31
6,185,100 B1 2/2001 Bentz et al.
6,231,017 B1 5/2001 Watkins
6,282,824 B1 9/2001 Noll et al.
6,379,209 B1 4/2002 Tucker
6,401,374 B1 6/2002 Bahmad
6,414,602 B2 * 7/2002 Polyakov ................. 340/691.6
6,442,026 B2 8/2002 Yamaoka
6,517,218 B2 * 2/2003 Hochstein ................... 362/294
6,553,697 B1 * 4/2003 Pichan ........................ 40/591

(Continued)

FOREIGN PATENT DOCUMENTS

JP 2000347609 12/2000

*Primary Examiner*—David P. Bryant
*Assistant Examiner*—Sarang Afzali
(74) *Attorney, Agent, or Firm*—Jenkens & Gilchrist, PC

(57) ABSTRACT

Disclosed is a display device, elongate mount, and display module for displaying alphanumeric information to passengers of a mass transit vehicle. The display modules are mounted along a single edge to a elongate mount. The elongate mount includes at least one end cap which is made of a vibration dampening material. The louver of the display device includes a substantially continuous pressure member in order to place substantially continuous elongate contact to an area of an LED board that houses at least one heating element. The at least one heating element is covered by a thermally conductive foam that transmits heat from the elements to a heat sink of the display module.

17 Claims, 8 Drawing Sheets

U.S. PATENT DOCUMENTS 6,634,124 B1 * 10/2003 Bierschbach ................. 40/452
2002/0164962 A1 * 11/2002 Mankins et al. .............. 455/99

* cited by examiner

METHOD OF INSTALLING AN ELECTRONIC DISPLAY DEVICE ON A VEHICLE

This patent application is a divisional application of pending U.S. patent application Ser. No. 10/385,820, filed on Mar. 10, 2003.

BACKGROUND OF THE INVENTION

1. Field of the Invention

The present invention relates to display devices and more particularly, to programmable displays for use on vehicles and about stations.

2. Description of the Related Art

Existing mass transit vehicles, such as buses and trains, carry destination and other signs for the purpose of conveying information to passengers using the mass transit vehicles. Destination signs inform passengers outside of the vehicle of the route information (route number and description). These signs may transmit information through a variety of display mechanisms. A sign may use light emitting diodes (LEDs), flip dot technology, or liquid crystal displays (LCDs), for example, in order to present alphanumeric information to the passengers. The destination signs normally are placed at the front of a mass transit vehicle over the windshield. The signs are mounted to the existing vehicle structure with various mounting brackets.

Typically, as shown in FIG. 1A, conventional destination signs utilize a chassis or frame assembly 100 constructed of steel or aluminum sheet metal to house the signs and other components. The sheet metal housing 10 is generally constructed in a rectangular box form with an opening, usually covered by transparent material 12, to enclose the entire housing 10 while still allowing passengers to easily read the alphanumeric characters generated by the sign. Various components are mounted to the housing 10 in order to prevent the components from shifting and breaking. In one embodiment, one such component is an LED board 16 with LEDs 14 coupled thereto that are controlled by a controller 18, which also is secured in the sheet metal housing 10 as shown in FIG. 1B. Other embodiments include LCDs and flip dot assemblies and the electronics associated therewith. Frame assembly 100 is mounted so that the LED board 16 is vertically upright, to permit passengers to view the characters formed by LEDs 14. Also enclosed in the housing 10 are the power supply and control board, as well as any other essential components needed for the frame assembly 100.

FIG. 1B illustrates an exploded view of the frame assembly 100 depicted in FIG. 1A. The exploded view shows the interior of the sheet metal housing 10 and some of the components typically secured within the housing 10. A louver 11, which minimizes glare to the LEDs, and the LED board 16 are secured to the housing 10 by fasteners 13, such as bolts or screws, along the lower edge of the housing 10, louver 11, and LED board 16 (a louver is optional for LCDs and flip dots). Such fasteners 13 thus compress the LED board 16 to the housing 10, but penetrate the LED board 16 to do so. By directly fastening the LED board 16 via the holes and fasteners 13 to the housing 10, a large amount of stress concentrates at the holes on the LED board 16. Any bending or torsion placed on the frame assembly 100 is translated to stress in the material adjacent to the holes of the LED board 16, often causing the LED board 16 to crack or cause electronics, including the display mechanisms, to deteriorate over time. Because mass transit vehicles are prone to vibration inducing or dynamic environments, failure rates of the conventional signs is high.

Furthermore, the LED board 16 also includes heat-emitting elements (not shown) that are covered by thermally conductive foam. The fasteners 13, penetrating LED board 16, press the foam to the LED board 16 and to the heat-emitting elements (not shown). The heat emitting elements generally include electronics, such as processors, power devices, etc. It is typical to use numerous fasteners 13 penetrating the LED board 16 to accomplish this. The fasteners 13 also are applied directly to LED board 16, thereby producing a concentrated stress around the area of the fasteners 13. If the fasteners 13 are over-tightened, then the LED board 16 cracks. Also inside the sheet metal housing 10 is a cable assembly 22 that transmits information and power to the LED boards 16 from the controller 18. Several cover assemblies 20 are secured to the LED board 16 and housing 10 to prevent movement or shifting of the components within the housing 10.

To further demonstrate the stress placed along the lower edge of the LED board 16, deflection measurements were taken at a plurality of locations along the lower edge of the LED board 16. Measurements of the fasteners 22 were taken and averaged to yield an average height of 0.320. These fasteners 22 are inserted at points 1, 3, 5, 7, 9, 11, and 13 in the lower edge of the LED board 16. Deflection of the LED board 16 at points (2, 4, 6, 8, 10, and 12) midway between the fasteners 22 is measured against the average height of the fasteners 22 height to determine if significant distortion occurs along the length of the LED board 16.

TABLE 1

Exemplary Deflection Measurements

| Position | Test 1 | Test 2 | Test 3 | Test 4 | Test 5 | Test 6 | Test 7 | Test 8 | Test 9 | Average | Average Distortion |
|---|---|---|---|---|---|---|---|---|---|---|---|
| 1 | 0.319 | 0.321 | 0.316 | 0.321 | 0.320 | 0.310 | 0.312 | 0.312 | 0.312 | 0.316 | 0.004 |
| 2 | 0.326 | 0.327 | 0.316 | 0.322 | 0.323 | 0.314 | 0.327 | 0.317 | 0.317 | 0.321 | 0.001 |
| 3 | 0.324 | 0.325 | 0.316 | 0.320 | 0.323 | 0.314 | 0.326 | 0.315 | 0.314 | 0.320 | 0.000 |
| 4 | 0.330 | 0.330 | 0.319 | 0.324 | 0.326 | 0.317 | 0.328 | 0.319 | 0.319 | 0.324 | 0.004 |
| 5 | 0.324 | 0.329 | 0.316 | 0.319 | 0.322 | 0.316 | 0.325 | 0.319 | 0.315 | 0.321 | 0.001 |
| 6 | 0.324 | 0.330 | 0.316 | 0.317 | 0.321 | 0.315 | 0.324 | 0.318 | 0.315 | 0.320 | 0.000 |
| 7 | 0.323 | 0.327 | 0.316 | 0.319 | 0.322 | 0.315 | 0.325 | 0.320 | 0.317 | 0.320 | 0.000 |
| 8 | 0.323 | 0.325 | 0.317 | 0.321 | 0.321 | 0.317 | 0.325 | 0.320 | 0.317 | 0.321 | 0.001 |
| 9 | 0.323 | 0.329 | 0.317 | 0.321 | 0.321 | 0.315 | 0.325 | 0.320 | 0.317 | 0.321 | 0.001 |
| 10 | 0.330 | 0.330 | 0.323 | 0.325 | 0.326 | 0.318 | 0.329 | 0.323 | 0.321 | 0.325 | 0.005 |
| 11 | 0.324 | 0.300 | 0.319 | 0.327 | 0.325 | 0.317 | 0.325 | 0.323 | 0.318 | 0.320 | 0.000 |

TABLE 1-continued

Exemplary Deflection Measurements

| Position | Test 1 | Test 2 | Test 3 | Test 4 | Test 5 | Test 6 | Test 7 | Test 8 | Test 9 | Average | Average Distortion |
|---|---|---|---|---|---|---|---|---|---|---|---|
| 12 | 0.328 | 0.330 | 0.324 | 0.329 | 0.326 | 0.318 | 0.328 | 0.325 | 0.324 | 0.326 | 0.006 |
| 13 | 0.323 | 0.326 | 0.320 | 0.325 | 0.321 | 0.317 | 0.321 | 0.321 | 0.317 | 0.321 | 0.001 |

As shown in TABLE 1, the deflection of the LED board 16 is substantial at the midway points across the lower edge. The distortion reaches as much as 0.006 at the plurality of measurement points along the lower edge of the LED board 16. As shown by the test results in TABLE 1, the considerable amount of distortion of the LED board 16 decreases heat transfer from the heat-emitting elements to the heat sink. Due to the flexibility of the LED board 16, a variation of up to (i) 10% in the deflection of the thermally conductive foam and (ii) 22% in the pressure applied to the heat-emitting elements (not shown) and thermally conductive foam severely decreases the effective thermal conductivity for the display.

The frame assemblies 100, as shown in FIGS. 1A and 1B, are stand-alone units, which are shipped and mounted to the mass transit vehicle in a single piece (i.e., as a single display unit). While multiple LED boards 16 (or LCDs or flip dot assemblies) may be utilized to form a complete display sign, the configuration of the conventional display signs is an integration of the LED boards 16 with the frame assembly 100 to form a sign. For the purposes of this discussion, the signs having the frame assembly 100 structurally coupled to each LED board 16 to form a housing of the display is considered to be non-modular. These frame assemblies 100 with the integrated LED boards 16 are usually four to six feet in length and can weigh from 30 to 50 pounds. Due to the cumbersome size and weight of the frame assemblies 100, shipping costs are high and at least two people are needed to maneuver and install the sign.

To install the sign, each of the upper and lower corners of the frame assembly 100 is mounted to the mass transit vehicle to secure the frame assembly 100 from shifting during the transport of passengers. If any portion of the sign, including the LED boards 16 and frame assembly 100, malfunctions, the repair process is very tedious and time-consuming even though the malfunction itself may be trivial. In addition, the frame assemblies 100 typically installed in mass transit vehicles may not adequately withstand many of the stresses associated with a moving vehicle. When these frame assemblies 100 are mounted to the mass transit vehicle, a frame assembly receives the stress and torque from the movement of the mass transit vehicle. When a mass transit vehicle turns, the side walls of the vehicle, ordinarily parallel to each other and perpendicular to the ceiling and floor, may shift angularly relative to the floor and ceiling of the mass transit vehicle so as to be non-perpendicular. In other words, the frame assembly 100 is constrained at the four corners forming a rectangle and stressed toward forming a non-rectangular parallelogram. As understood in the art, an over-constrained sheet metal housing is stressed by the shifting and may be pulled apart or distorted under such forces.

Therefore, there is a need for an easily installed and easily repaired destination sign capable of withstanding the stresses exerted by a mass transit vehicle. There is also a need for a destination sign capable of dissipating heat without causing significant stress to the LED board.

SUMMARY OF THE INVENTION

To remedy the deficiencies of conventional display signs used in mass transit vehicles, the principles of the present invention provide for modular display modules to be mounted to an elongate mounting system in a limited manner to result in minimal stresses to be applied to the display modules, thereby reducing failure rates of the signs and simplifying repair efforts. The elongate mounting system includes at least one mounting surface of an elongate mount and is operable to receive the display modules. The mounting system also includes at least one fastener for securing a single edge of the at least one display module to the elongate mount and at least one mounting bracket that secures the elongate mount to the mass transit vehicle.

The display module is a modular display unit that may include a louver or front plate and LED board (or LCD or flip dot assembly). To dissipate heat from a heat-emitting element (e.g., processor, power amplifier, etc.), at least one substantially continuous pressure member operable to place continuous linear contact to the area of an LED board may be included in the display modules. The display module may also include a thermally conductive foam in contact with the heat-emitting elements of the LED board. A heat sink may be included in the display module to maintain continuous linear contact with the thermally conductive foam to assist in dissipating heat therefrom as understood in the art.

One embodiment of a display sign according to the principles of the present invention includes an elongate mount operable to be mounted on a mass transit vehicle and at least one display module configured to be coupled to the elongate mount and operable to display alphanumeric characters of a variety of fonts including Roman characters, Arabic script, etc. The display module(s) may be secured to the elongate mount along a single edge to reduce stresses to the display module(s).

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION

The principles of the present invention provide for an electronic signs system for vehicles to be composed of self-contained display modules and an elongate mount adapted to support the display modules and mount to the vehicle so as to minimize potential damage to the display modules. The vehicles can include mass transit vehicles or other types of vehicles. Some examples of mass transit vehicles includes buses, trains, or other vehicles that display information and/or advertisements to passengers or the public. The display modules may include electronic display elements, electronics, and a housing. In one embodiment, the housing is composed of a louver structure and a backplate optionally operable as a heat sink. In lieu of the louver structure, the housing can incorporate another structure that allows the electronic display elements to be visible. Some examples of alternates can include a transparent material optionally treated to reduce glare or an apertured structure through which the display elements are visible. To reduce manufacturing costs, the housing components may be configured to be engaged without additional fastening elements, such as screws, bolts, snaps, etc. By producing display modules that can be configured into an electronic sign, shipping and installation costs and complexity of the sign may be significantly reduced compared to conventional signs that are produced as a single, integrated display module.

To configure the sign, the display modules may be coupled to the elongate mount via a minimal number of connection points (e.g., two) to avoid stress forces from being applied to the housing of the display modules. The elongate mount may be coupled to the mass transit vehicle at one or more connection points to minimize stress forces and vibration from being applied to the elongate mount to avoid damage to the display modules and thereby providing for extended operational life of the sign. It should be understood that the same or similar configurations of the sign according to the principles of the present invention may be utilized in stationary positions, such as a wall in a bus or airplane terminal.

Figure 1A:
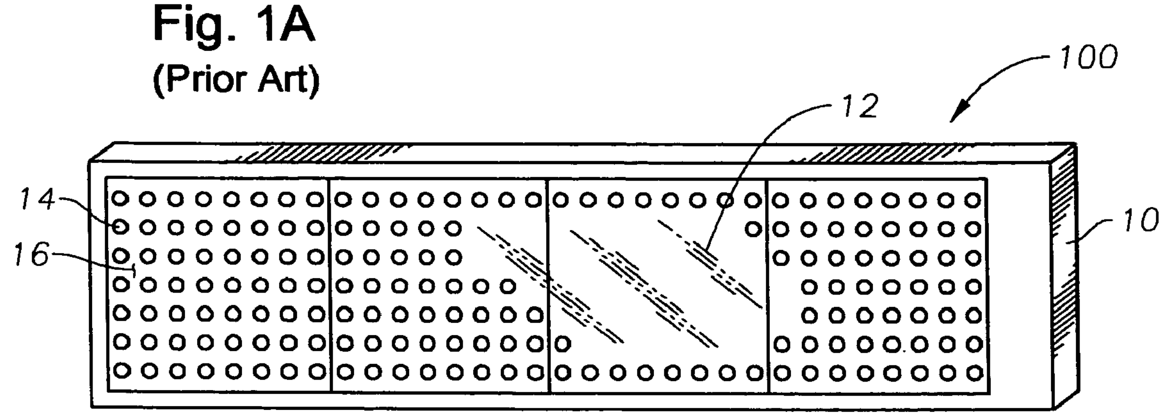
Fig. 1A (Prior Art)
FIG. 1A (Prior Art) illustrates an existing display device.
Figure 1B:
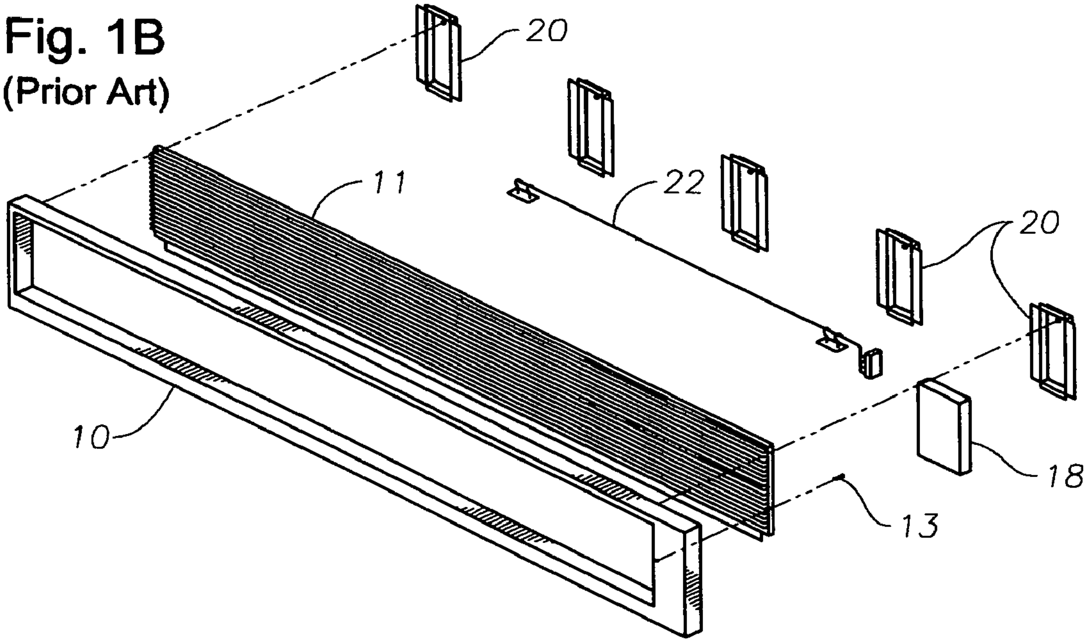
Fig. 1B (Prior Art)
FIG. 1B (Prior Art) illustrates an exploded view of FIG. 1A.
Figure 2:
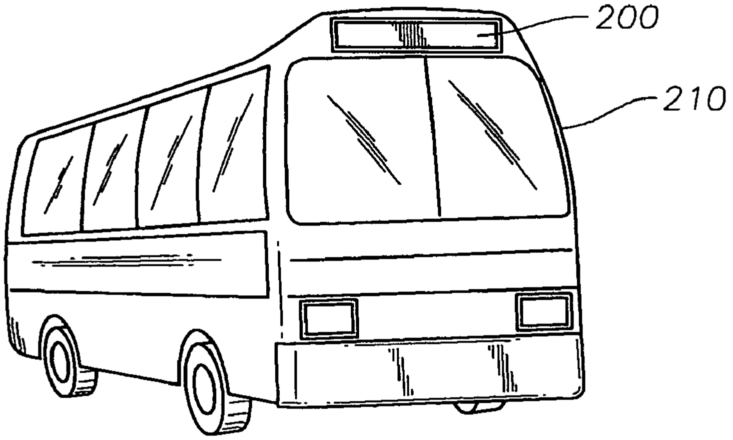
FIG. 2 illustrates an exemplary display system in use on a vehicle.

Referring briefly to FIG. 2, an exemplary electronic sign system 200 depicted in use on a vehicle 210 is illustrated.

Figure 3A:
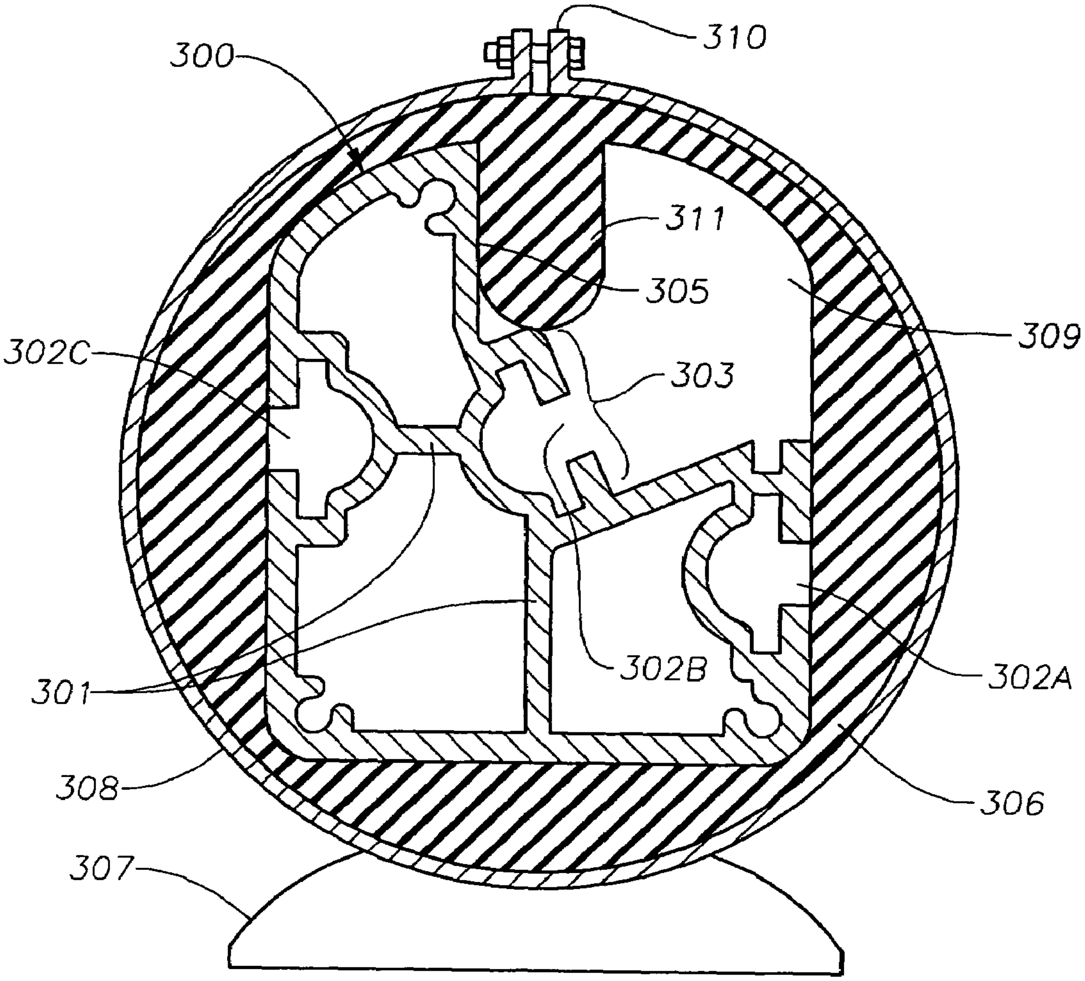
FIG. 3A illustrates a side view of an elongate mount with isolating elements and a mounting bracket in accordance with an embodiment of the present invention.
Figure 3B:
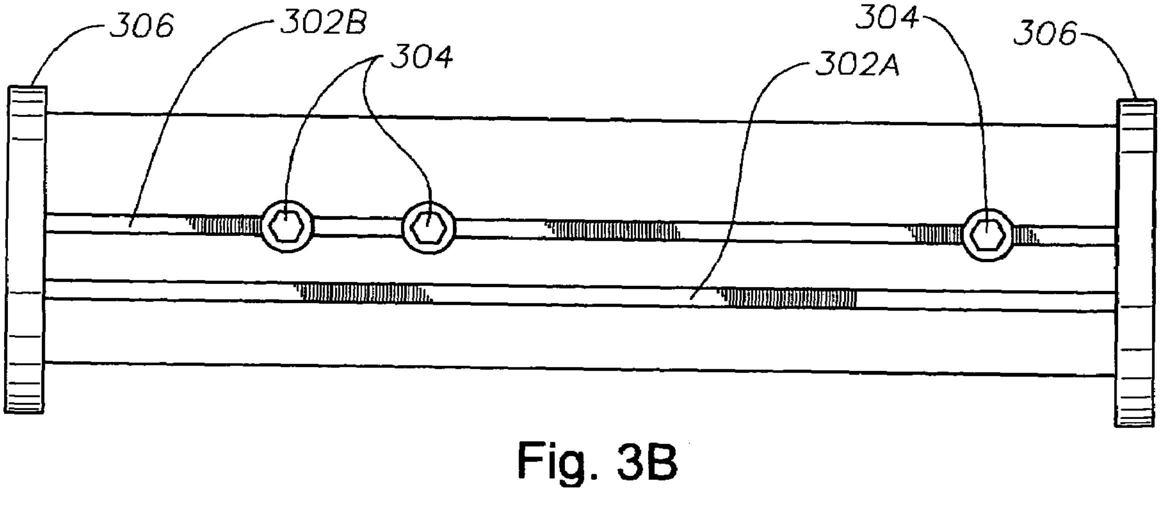
FIG. 3B illustrates a front view of the elongate mount and isolating elements of FIG. 3A.

Now, with reference to FIGS. 3A and 3B, an elongate rail or mount 300 in accordance with a preferred embodiment of the present invention is described. The elongate mount 300 can, in an exemplary embodiment, be manufactured by a process of extruding aluminum, however, other metals, composites, or polymers may also be used. In addition, other processes may be used if they meet the structural requirements described herein. As illustrated in the side view in FIG. 3A, this embodiment of the elongate mount 300 has several hollow portions, three slots 302A, 302B and 302C and two strengthening members 301. The elongate mount 300 defines at least a first substantially planar mounting surface 303 and a second substantially planar mounting surface 305. In one embodiment, the first mounting surface 303 resides at an angle to the second mounting surface 305 such that a plane parallel to the first mounting surface 303 intersects a plane parallel to the second mounting surface 305. Although an elongate mount 300 of the preferred embodiment is tubular and includes the hollow portions, in alternate embodiments, the elongate mount 300 may be solid, or may have a honeycomb type interior to further strengthen the elongate mount 300.

The slot 302 structure allows for flexible attachment of components of a variety of sizes in a variety of positions. The slot 302B of the mounting surface 303, located near the center of the elongate mount 300, may be used to secure the components for a display. The second mounting surface 305 resides about the slot 302B. The supplementary slots 302A and 302C may be used to secure a number of additional components that may or may not be related to the display. The slots 302 allow exemplary fastener T-bolts 304 in FIG. 3B to slide to any point along the slot 302. A T-bolt 304 is a nut and bolt type of fastener where the head of the bolt slides in the groove of the slot 302. The nut portion of the T-bolt 304 can be loosened or removed to insert a component and then tightened to secure the component in place in a cantilever-type fashion along the mounting surface 303. In an alternate embodiment, instead of using a slot 302, the mounting surface 303 may have holes drilled at certain intervals in order to secure components in place, or the mounting surface 303 may be a solid piece. If the mounting surface 303 is solid (not shown), then holes may be drilled once the configuration of the display is determined.

Located at each end of the elongate mount 300 is an isolating element such as an end cap 306 made of a vibration dampening material. In one embodiment, that material is an incompressible elastomer. The interior of the end caps 306 are cut or otherwise formed to the exterior shape of the elongate mount 300 in order to allow the end caps 306 to slide onto the end of the elongate mount 300. To further limit the stresses placed on the elongate mount 300, the elongate mount may have an additional section 309 to make the elongate mount 300 more symmetrical. By including the additional section 309 at the portion of the elongate mount

300 covered by the end caps 306, the spring constants at each corner of the elongate mount 300 are substantially equalized. The end caps 306 may have a protrusion 311 that extends outward in the additional section 309 into an open area of the elongate mount 300 to abut the elongate mount 300 and prevent rotation of the elongate mount 300 relative to the end cap 306. Alternatively, the additional section 309 may be omitted, and the end caps 306 may fill in the entire area between the elongate mount 300 and mounting brackets 308. The end caps 306 may be made of shore A scale 50–80 durometer urethane, however, other materials with similar characteristics may be substituted. Depending on the weight of the display, the durometer of the end caps 306 may be 50–70 durometer or 60–80 durometer. End caps 306 provide a compliant structure for attaching the elongate mount 300, permitting relative movement between at least one mounting bracket 308 and the elongate mount 300. The end caps 306 also reduce the stress applied to the elongate mount 300 and dampen the vibrations reaching the elongate mount 300 that are applied to mounting brackets 308 by the vehicle. The end caps 306 at least partially absorb the stress and acceleration that the vehicle experiences that would otherwise be applied to the display. The end caps 306 maintain their position while flexing, minimizing distortion of the end caps 306. The mounting brackets 308 enclose the end caps 306 so that the elongate mount 300 may be mounted in the vehicle. In one embodiment, the mounting brackets 308 are configured as a split ring with two flanges 310 located along the mounting bracket 308. The two flanges 310 provide a surface or hole for a fastener to clamp the two flanges 310 together. For example, a screw or bolt may be inserted through holes of the flanges 310 and tightened to hold the end caps 306 in place. The screw may also be loosened to allow the end caps 306 to rotate, thereby also rotating the elongate mount 300, and facilitating access to the mounting surface 303. Also located along the mounting bracket 308, is a mounting portion 307. The mounting portion 307 provides a surface with which the elongate mount 300 is fastened to the vehicle. Various different mounting brackets 308 may be used, depending on the position required for mounting the elongate mount 300.

Figure 4A:
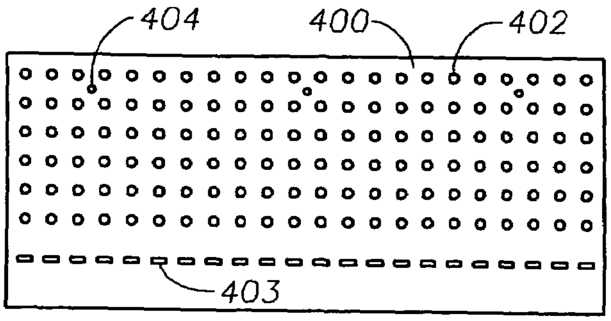
FIG. 4A illustrates a front view of an LED board in accordance with an embodiment of the present invention.
Figure 4B:
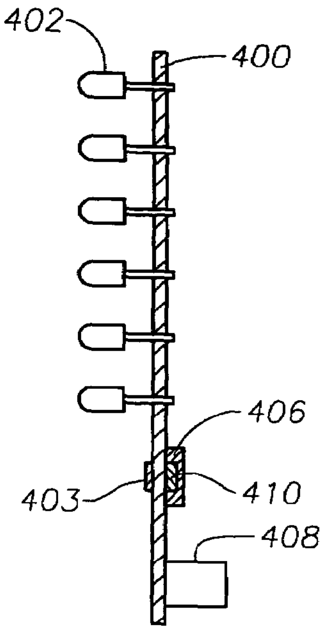
FIG. 4B illustrates a side view of the LED board of FIG. 4A.
Figure 4C:
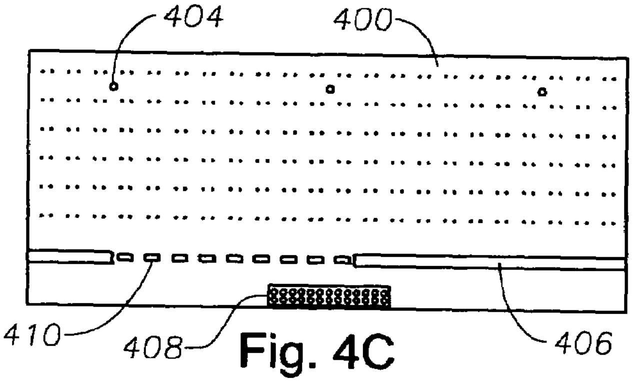
FIG. 4C illustrates a back view of the LED board of FIG. 4A.

FIGS. 4A–4C illustrate a front, side, and back view of an LED board 400 in accordance with an embodiment of the present invention. From the front view of the LED board 400 in FIG. 4A, LED bulbs 402 are visible. Also shown are optional hole 404 drilled through the LED board 400 which may be used to secure components together and indirectly secure the LED board 400 to other components. The optional holes 404 also act as a registration point for ensuring that the LED board lines up properly with other components. Typically, only two such holes are needed to register the LED board 400. The optional holes 404 are positioned away from the lower edge of the LED board 400 in order to minimize stress and flexion near the heat-emitting elements 410. Located along the front side of the LED board 400, near the lower edge, is a row of resistors 403. Also near the lower edge, usually arranged in a row along the backside of the LED board 400 as shown in FIGS. 4B and 4C is a strip of thermally conductive foam 406 laid over heating emitting elements 410. The foam 406 conforms itself around the heat-emitting elements 410 under compression and is shown partially removed in FIG. 4C to expose heat-emitting elements 410. The viscoelastic nature of the foam 406 dampens low stress vibration and also has shock absorbing characteristics. The foam 406 may be a filled thermally conductive polymer supplied on a rubber coated fiberglass carrier, which enhances puncture, shear, and tear resistance. Gap Pad VO ULTRA Soft™ may be used. Foam 406 may be 0.020–0.250 inches in thickness. In one embodiment, the foam 406 has a substantially linear deflection pressure response of about 13.67%/p.s.i. and a substantially linear thermal resistance of about 50° csq.in./w per inch and thermal conductivity (at 10 p.s.i.) of about 1 w/m-k. Heat-emitting elements 410, such as integrated circuits or display drivers (ex. an LED driver), along with the resistors 403 provide signals and power to the LEDs 402. A connector 408 interfaces with a cable assembly that transmits control signals and power to the LED board 400 from a power control module (not shown). The connector 408 distributes the received signals to the heat-emitting elements 410 beneath the layer of thermally conductive foam 406.

Figure 5A:
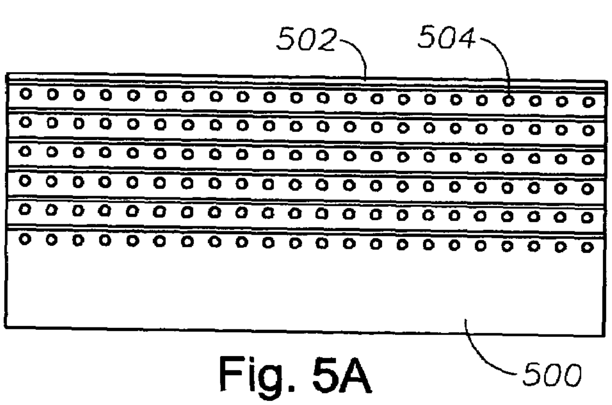
FIG. 5A illustrates a front view of a louver with a continuous pressure member in accordance with an embodiment of the present invention.
Figure 5B:
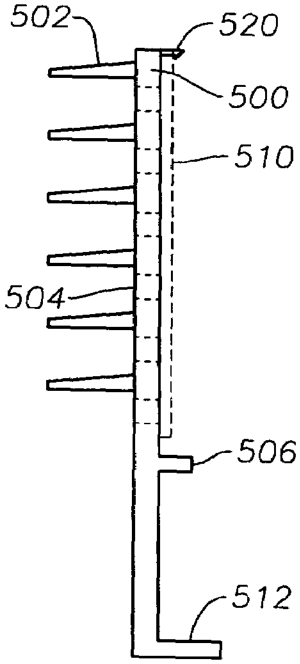
FIG. 5B illustrates a side view of the louver of FIG. 5A.
Figure 5C:
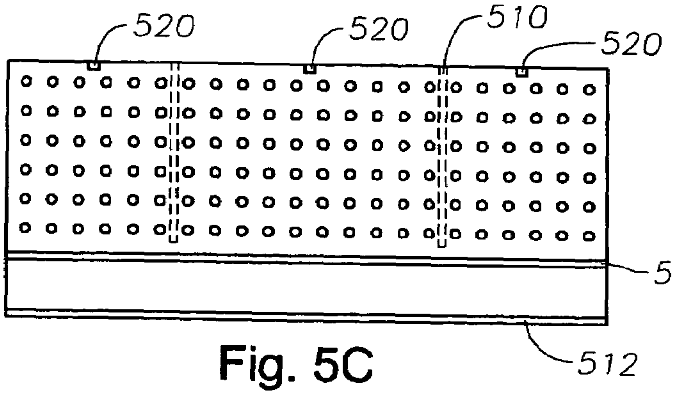
FIG. 5C illustrates a back view of the louver of FIG. 5A.

Now referring to FIGS. 5A–5C, a louver 500 in accordance with an embodiment of the present invention is illustrated. The louver 500 is typically made of plastic and may be constructed from small boards that connect to form one larger board. Each louver 500 includes screens 502 positioned to shade the LEDs 402 from light such as the sun. Holes 504 are placed between screens 502 to receive the LEDs 402 of the LED board 400. The louver 500 has a male snap barb 520 extending outward therefrom.

As shown in FIGS. 5B and 5C, a continuous pressure member 506 is formed in a lower portion of the louver 500 in a substantially horizontal orientation, parallel to the screens 502. This stiffens the louver 500 in that horizontal axis. The continuous pressure member 506 serves to apply substantially continuous linear contact and pressure to the LED board 400 in the area of the resistors 403, which oppose heat-emitting elements 410. This in turn applies pressure to the foam 406. The continuous pressure member 506 offers increased pressure to hold the thermally conductive foam 406 in intimate contact with the heat-emitting elements 410, and to provide substantially uniform compression of the thermally conductive foam 406 over the heat-emitting elements 410. Optional transverse pressure members 510 may be placed throughout the back side of the louver 500 oriented transversely to the screens 502 to add increased rigidity. In addition, a lower projection 512 is formed at the lower edge of the louver 500 in a substantially horizontal orientation, parallel to the screens 502. The projection 512 extends further than the continuous pressure member 506 to make contact with a backplate (not shown). The projection 512 serves as a lower barrier for other components within the display. Other components within the display, such as the LED board 400, have a lower edge that may rest on the upper edge of the projection 512.

Figure 6B:
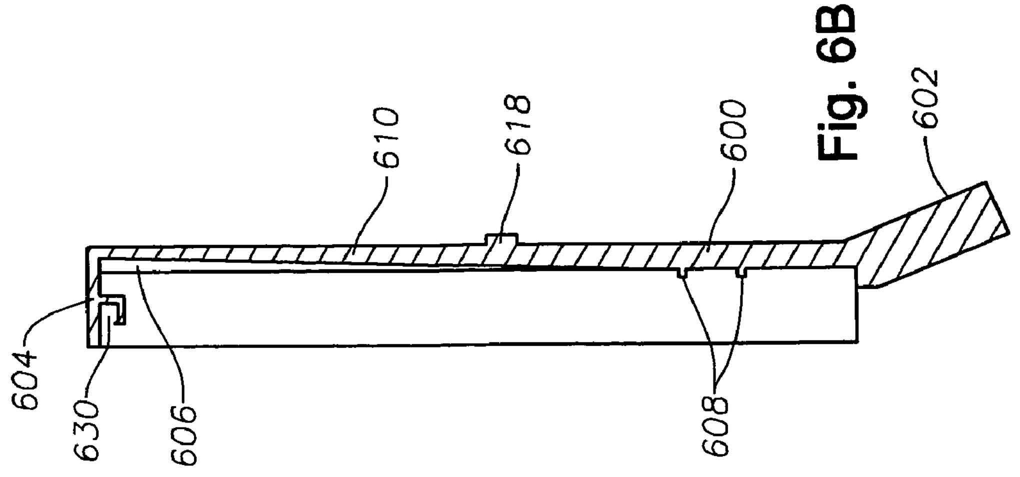
FIG. 6B illustrates a sectional view of the backplate of FIG. 6A along line A.
Figure 6A:
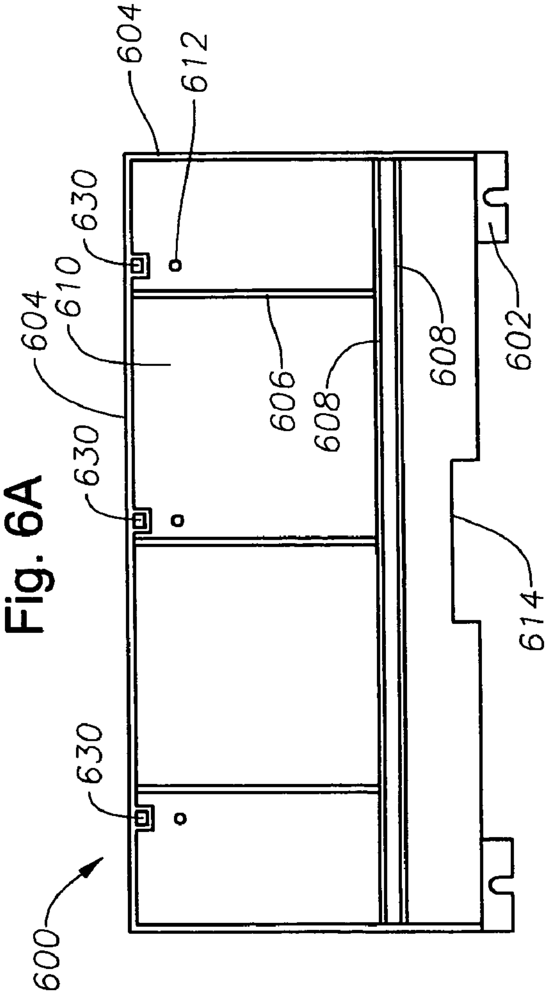
FIG. 6A illustrates a front view of a backplate in accordance with an embodiment of the present invention.
Figure 6C:
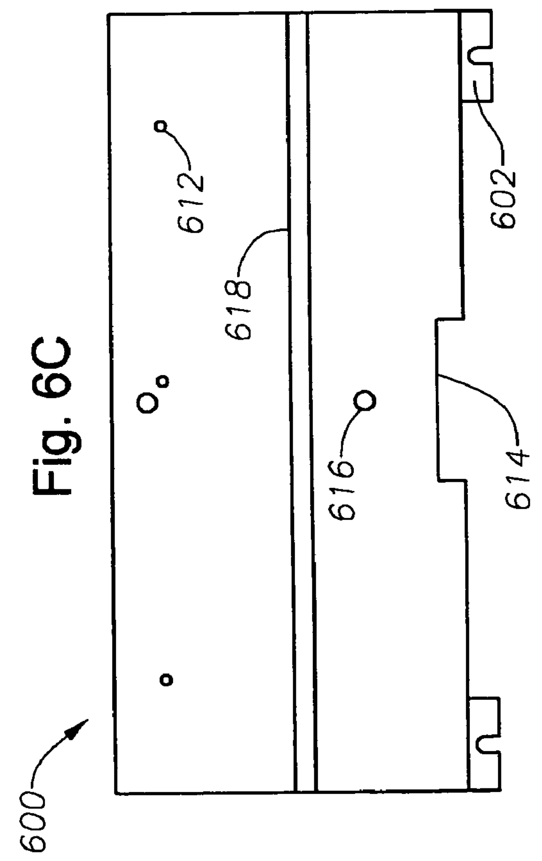
FIG. 6C illustrates a back view of the backplate of FIG. 6A.

FIGS. 6A–6C illustrate a backplate 600 in accordance with one embodiment of the present invention. In one embodiment, the backplate 600, shown in the front view of FIG. 6A, possesses two elongate flanges 602 extending at an angle from the lower edge of the backplate 600. Alternatively, the elongate flanges 602 may also lie in (or substantially in) the same plane as the backplate 600. The elongate flanges 602 are fastened to the elongate mount 300 by the T-bolts 304 shown in FIG. 3B. An edging 604 around the top and sides of the backplate 600 encloses the louver 500 so that the LED board 400 is clamped between the louver 500 and backplate 600. In one embodiment, additional vertical members 606, located at one or more positions along the interior of backplate 600, add to the rigidity of the backplate 600. An additional transverse member 618 may be added along the back side of the backplate 600 to further increase rigidity. The backplate 600 has one or more female snap barb receptacles 630 thereon. The female snap barb receptacles 630 are adapted to receive the male snap barbs 520 of the louver 500 to releasably lock the louver 500 and backplate 600 in fixed relation.

Remaining with FIGS. 6A–6C, two horizontal pressure members 608 are oriented to form upper and lower barriers for the layer of conductive foam 406 covering the heat-emitting elements 410 of the LED board 400. The horizontal pressure members 608 prevent the foam 406 from dispersing along the backplate 600 and also aid in further compression of the foam 406. The backplate 600, at least about the horizontal pressure members 608, can be constructed from a thermally conductive material such as metal. The backplate 600 receives heat, via the foam 406, which dissipates through a tapered back surface of the backplate 600. The tapered back surface forms a heat sink 610 to remove heat from the display. The tapered heat sink 610 optimizes the dispersion of heat received from the heat-emitting elements 410 through the foam 406 by progressively decreasing the thickness of back plate 600 in the upper portion, thus increasing the thermal resistance. This has the additional advantage of decreasing the weight of the entire unit, especially in the portion more distant from the elongate mount 300, and thus decreasing torque due thereto. Alternatively, the heat sink 610 may not be tapered, or may be manufactured in other orientations. Holes 612 are arranged matching the holes of the LED board 400 in order to secure the backplate 600 and LED board 400 together and to register the LED board 400 and backplate 600 with each other. An aperture 614 is formed near or at the lower edge of the backplate 600 to provide access to the connector 408 and the cable assembly (not shown). Additional holes 616 of the provide for a handle to be fastened to the backplate 600 to allow for increased mobility.

Figure 7A:
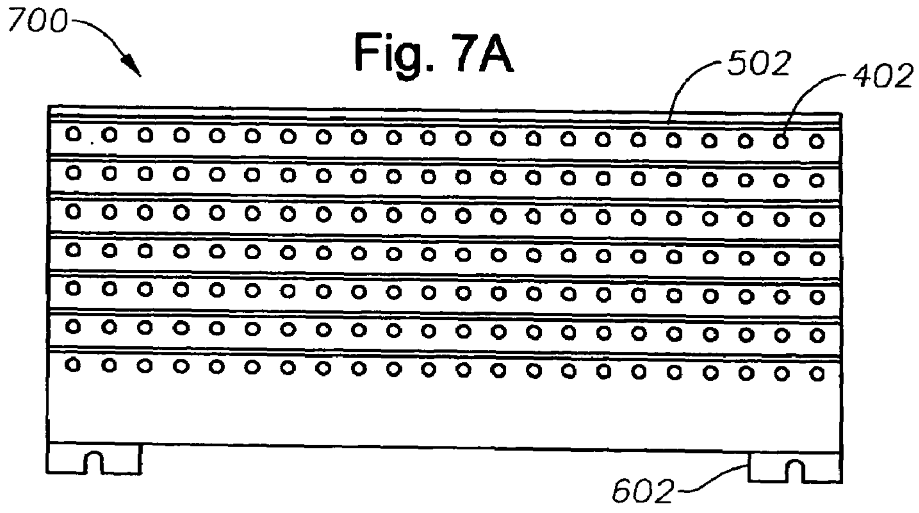
FIG. 7A illustrates a front view of a display module in accordance with an embodiment of the present invention.
Figure 7B:
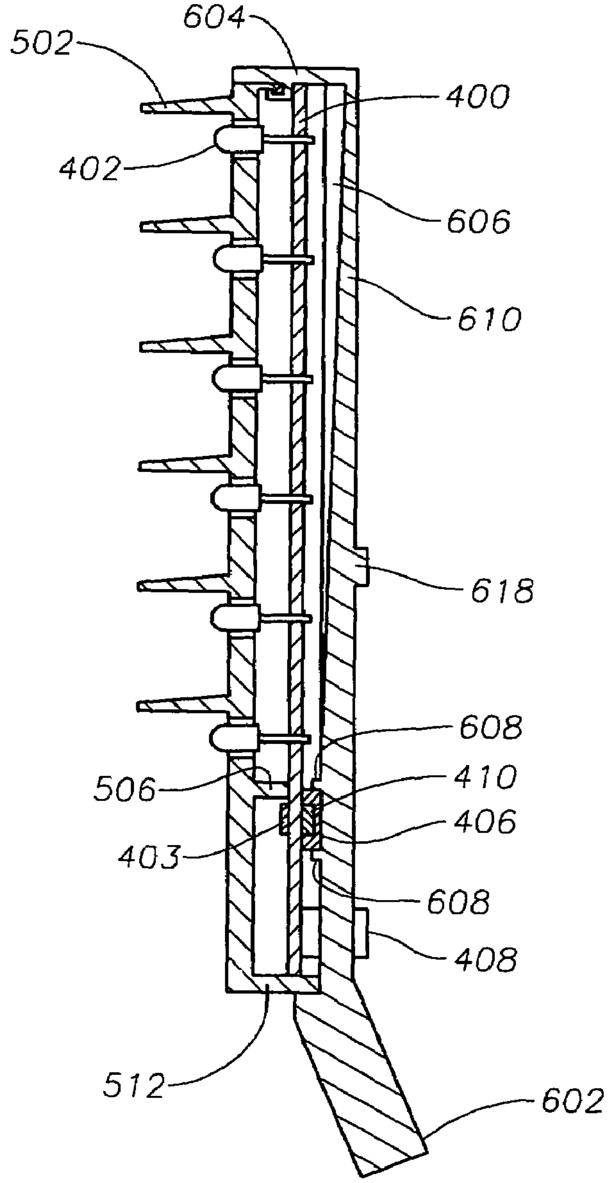
FIG. 7B illustrates a sectional view of the display module of FIG. 7A along line A.

Turning now to FIGS. 7A–7B illustrating an exemplary electronic display module 700 that includes the louver 500 of FIGS. 5A–5C, the LED board 400 of FIG. 4A–4C, and the backplate 600 of FIG. 6A–6C. The LED board 400 and the louver 500 are pressed together so that the LEDs 402 fit through the holes 504 of the louver 500. The continuous pressure member 506 presses the front side of the LED board 400 in the area of the heat-emitting elements 410 which are covered by the foam 406. The foam 406 is pressed, via the continuous pressure member 506, into continuous intimate contact with the backplate 600 and into substantially uniform compression over heat-emitting elements 410. The heat sink 610 of the backplate 600 absorbs and dissipates the heat given off by the heat-emitting elements 410. The horizontal pressure members 608 can be oriented on each side of the foam 406 to further compress and maintain contact between the foam 406 and the backplate 600.

Remaining with FIGS. 7A–7B, the display module 700 may be held together by fasteners that fit in the holes 404 and 612 of the LED board 400 and backplate 600. Fasteners may easily fit through all of the components and secure them tightly together. For example, screws may be placed through the LED board 400 and fastened to the backplate 600. The louver 500 snaps on to the backplate 600 without additional fasteners.

Figure 8:
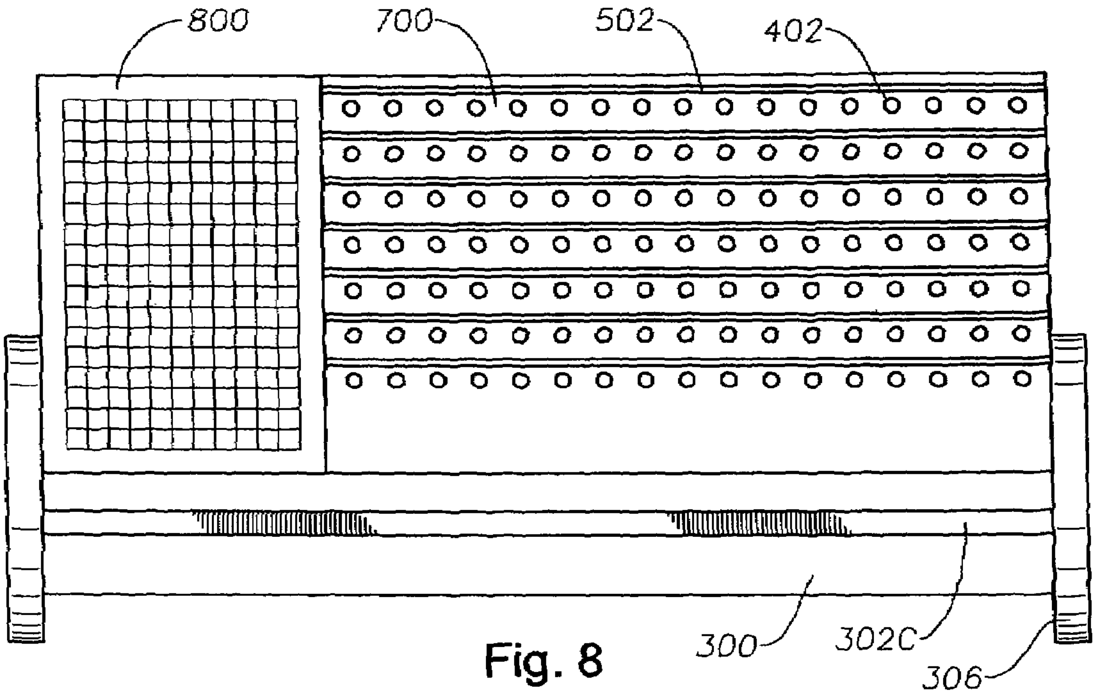
FIG. 8A illustrates an assembled display device in accordance with an embodiment of the present invention.
FIG. 8B illustrates the assembled display device of FIG. 8A.
Figure 8B:
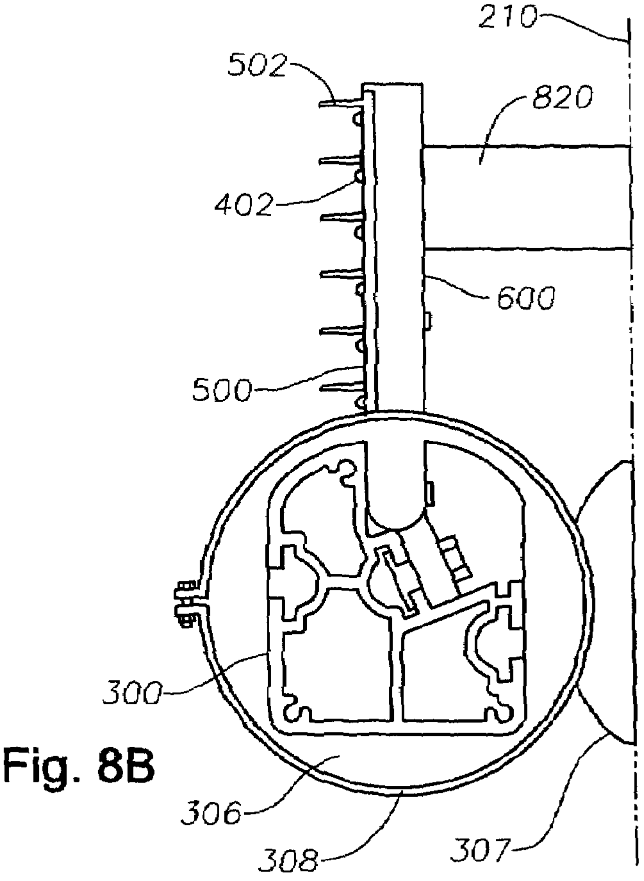

Now referring to FIGS. 8A and 8B, a power control module 800 can be used to power the display modules 700. The power control module 800 has a housing similar to that of the display module 700 of FIGS. 7A and 7B. The power control module 800 has a cover, a power supply/controller board, and a heat sink. The power supply/controller board has a connector that transmits signals to the display module 700 via the cable assembly. In one embodiment, the power control module 800 also includes at least one elongate flange similar to the elongate flanges 602 of the backplate 600 for fastening to the elongate mount 300.

At least one display module 700 is secured to the elongate mount 300 by elongate flanges 602 and T-bolts 304. In an exemplary embodiment, the installed display modules 700 reside substantially above the elongate mount 300. It is within the scope of the invention that the display modules 700 reside completely above or substantially below the elongate mount 300, that is, with a majority of the display module 700 below the center of the elongate mount 300.

When securing the display modules 700 to the elongate mount 300, the display modules 700 can be rested on the elongate mount 300 with the T-bolts 304 in the slot 302B and slide relative to the length of the elongate mount 300 to reach the desired position. Thereafter, the T-bolts 304 can be tightened to secure their position. In an exemplary embodiment, up to five display modules 700 are affixed to the elongate mount 300 such that substantially all constraint to movement of the display modules 700 is provided by the elongate mount. However, it is within the scope of the present invention to affix fewer or more than five display modules 700 to the elongate mount 300.

A power control module 800 may be secured to the elongate mount 300 in a similar manner and connected, via a cable assembly, to the display module 700. Alternatively, two or more display modules 700 with separate mounts may be fastened to the elongate mount 300 and connected to a power supply via the cable assembly. Although not shown here, a plurality of the modules 700 may be attached to elongate mount 300 to form a larger display, or to permit more easily-shipped, smaller modules to be used. Optimally, T-bolts 304 secure each of the two lower corners of the power control module 800 and of the display module 700. More or less T-bolts 304 may be used to securely fasten the power control module 800 and the display module 700 to the elongate mount 300. Substantially all of the vertical support of the display module 700 and power control module 800 is provided by the elongate mount 300. Although depicted in a substantially vertical position, the orientation of the display modules 700 and power control modules 800 can be changed in relation to the vehicle 210 by changing the orientation of the elongate mount 300. For example, by loosening the mounting brackets 308 grip on the end caps 306, the end caps 306 and elongate mount 300 can be rotated about their longitudinal axis to position the display module 700 and power control module 800 in a different orientation.

The power control module 800 may be located at a position other than the elongate mount 300. For example, the power control module 800 may be mounted on a wall near the display module 700 and elongate mount 300.

As seen in FIG. 8B, the display module 700 need not be entirely supported on the elongate mount 300. Rather it is within the scope of the invention to include a support member 820 between the display module 700 and the vehicle 210. In one exemplary embodiment, the support member 820 is a flexible coupling affixed to both the vehicle 210 and the display module 700. In another exemplary embodiment, the support member 820 is a bumper that abuts but is not affixed to the vehicle 210.

Figure 9:
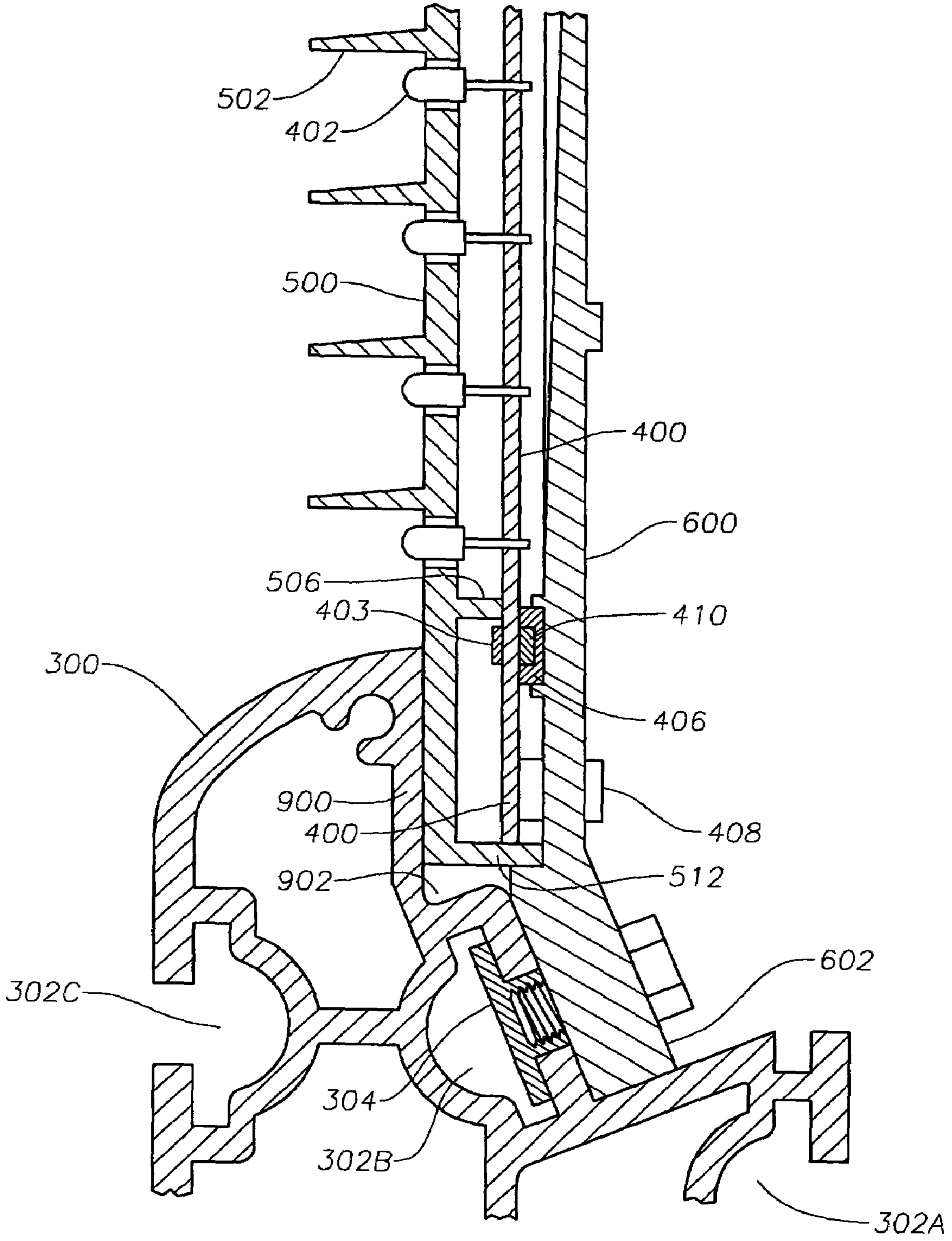
FIG. 9 illustrates a cut away detailed side view of the display module fastened to the elongate mount.

Now referring to the side view of FIG. 9, a portion of the assembled display module 700 and the elongate mount 300 are shown in more detail. The display module 700 is fastened via a T-bolt 304 to the elongate mount 300 in a cantilevered fashion. The head of the T-bolt 304 rests in the central slot 302B. The louver 500 abuts the second mounting surface 305 and the flange 602 abuts the first mounting surface 303. The T-bolt 304 is tightened so that the pressure forces the backplate 600 to press the other components of the display module 700 tightly against a the second mounting surface 305 of the elongate mount 300. The lower edge of the display module 700 rests near a corner 902 of the elongate mount 300 formed by the mounting surface 305 and material about the upper portion of the slot 302B. Tightening the T-bolt 304 effectively clamps the other components of the display module 700 (e.g. the LED board 400 and the louver 500) between the backplate 600 and the vertical face 900. This pressure aids in ensuring that the continuous pressure member 506 maintains continuous contact with the LED board 400 and that the thermally conductive foam 406 maintains continuous substantially even contact and compression with the backplate 600. The continuous contact between the continuous pressure member 506, LED board 400, foam 406, and backplate 600 produces more evenly distributed pressure between the foam 406 and the heat-emitting elements 410. This permits increased heat transfer in order to keep the heat-emitting elements cool. In addition, few, if any screws are used to maintain pressure between the LED board 400 and backplate 600 thereby reducing deflection of the LED board 400. Any screws penetrating LED board 600 in the vicinity of heat-emitting elements 410 do so without applying pressure directly thereto. By minimizing the deflection, heat transfer is maximized.

Figure 10:
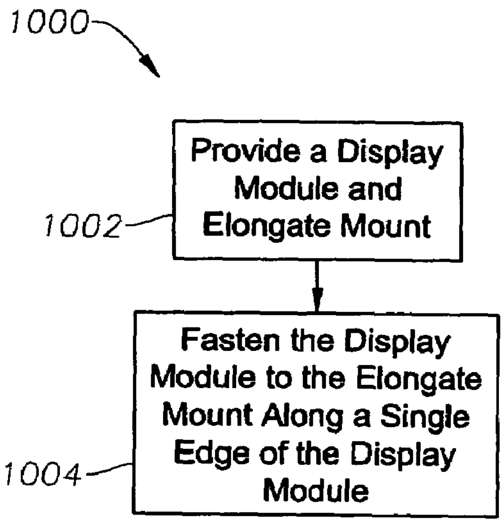
FIG. 10 illustrates a method for assembling the display device in accordance with an embodiment of the present invention.

Now with reference to FIG. 10, a method 1000 of assembling the display device in accordance with the principles of the present invention is described. First, at step 1002, one or more display modules 700 and elongate mount 300 are provided. In providing the display module at step 1004, the display module 700 is fastened to the elongate mount 300 along a single edge of the display module 700. The display module 700 is fastened to the elongate mount 300 with a fastening structure aligned longitudinally along the elongate mount 300. The display module 700 is fastened to the elongate mount 300 by clamping a face of the display module 700 opposing the elongate mounting flange to a clamping face of the elongate mount 300. When the display module 700 and elongate mount 300 are fastened together, a substantially continuous member is compressed to a first face of the LED board 400 of the display module 700 adjacent to the heat-emitting elements 410. The LED board 400 is clamped between the backplate 600 and the elongate mount 300. The elongate mount 300 may be isolated from a source of vibration and translational movement, such as that exhibited by the vehicle, by an incompressible elastomeric mount 306. Each end of the elongate mount 300 is inserted into one of the incompressible elastomeric mounts 306. A mounting structure 307 may be loosened to allow rotation of the elongate mount 300.

Figure 11:
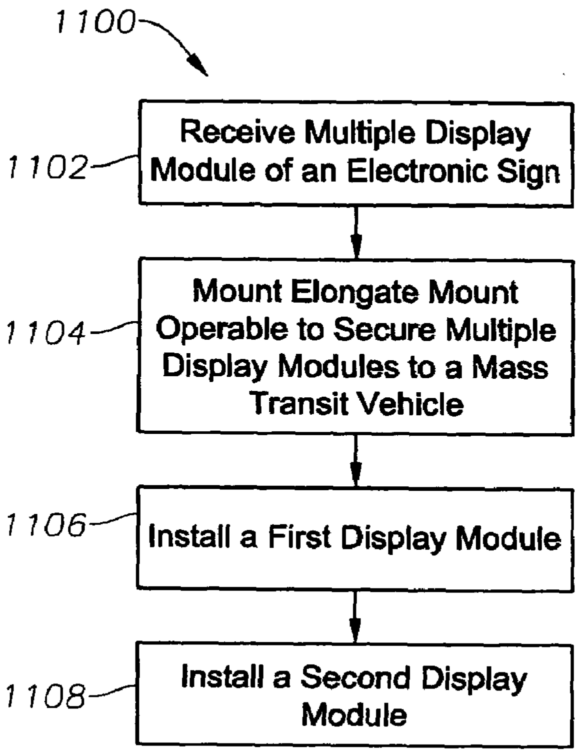
FIG. 11 illustrates a method for installing an electronic sign in accordance with an embodiment of the present invention.

Referring now to FIG. 11, a method 1100 for installing an electronic sign in accordance with a preferred embodiment is described. An original equipment manufacturer (OEM), such as a vehicle manufacturer, or a purchaser of a vehicle first receives multiple display modules 700 of the electronic sign at step 1102. At step 1104 an elongate mount 300, operable to secure the display modules 700, is mounted in the vehicle. The elongate mount 300 may be shipped as a single piece to vehicle purchasers, or may be shipped to vehicle manufacturers to be integrated into the vehicle before the vehicles are sold to the companies that will utilize them. The elongate mount 300 may be shipped in a specific length to fit precisely in the vehicle, or the elongate mount 300 may be shipped in longer lengths and the OEM or purchaser cuts the elongate mount 300 to fit their specifications. The integration of the elongate mount 300 to the vehicle may occur at the manufacturing stage before the purchaser acquires the vehicle, or at a time after the purchase of the vehicle that the purchaser determines an electronic sign will be necessary. At step 1106, a first display module 700 is installed onto the elongate mount 300. A second display module 700 is then installed onto the elongate mount 300 at step 1108. Additional display modules 700 may be installed onto the elongate mount 300, depending on the desired orientation and size of display device that the purchaser wishes to install. The power control module 800 may also be fastened to the elongate mount 300 or at another location of the vehicle. Then the company may order the specific number of display modules 700 and power control modules 800 necessary to meet their needs. Furthermore, if a display module 700 or power control module 800 malfunctions, then only the piece that is malfunctioning requires reordering and replacement.

Figure 12:
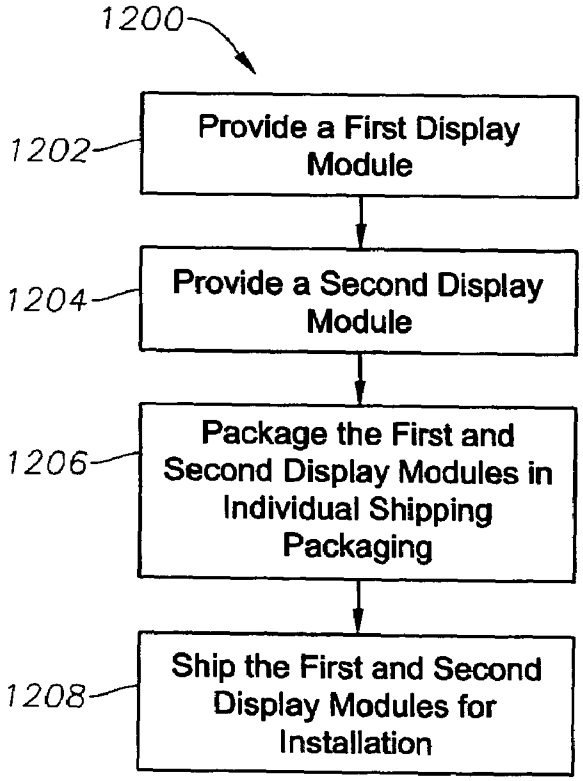
FIG. 12 illustrates a method for providing an electronic sign in accordance with an embodiment of the present invention.

Now referring to FIG. 12, a method of providing an electronic sign is illustrated. At step 1202, a first display module 700 is provided. Next, at step 1204, a second display module 700 is provided. The first and second display modules 700 are then packaged in individual shipping packaging at step 1206. At step 1208, the first and second display modules 700 are shipped for installation on the vehicle. By shipping the display modules 700 prior to assembly, shipping and labor costs are significantly reduced. The provided display modules include electronic display elements (typically LEDs) having substantially similar illumination characteristics, as well as substantially similar color characteristics resulting from a binning process. The shipping packages and the display modules 700 have an identifier noting the illumination and color characteristics of the electronic display elements, so that should the display module 700 need to be replaced, the purchaser can be assured that he will receive a replacement display module 700 with similar illumination and color characteristics to the original display module 700.

The previous description is of a preferred embodiment for implementing the invention, and the scope of the invention should not necessarily be limited by this description. The scope of the present invention is instead defined by the following claims.

What is claimed is:

1. A method of installing an electronic display device on a vehicle, comprising the steps of:

mounting a single elongate mount to a vehicle, the elongate mount having a linear length, a first mounting surface in a first plane that is parallel to the longitudinal axis of the elongate mount, and a second mounting surface in a second plane that is also parallel to the longitudinal axis of the elongate mount, said first plane being at an angle to said second plane;

coupling a panel display module to said single elongate mount along a single edge of said panel display module such that a display cover on one side of the panel display module is compressed against a support member of the panel display module by said first mounting surface when a flange portion on the support member along the single edge of said panel display module is attached to said second mounting surface.

2. The method claim 1, wherein coupling said panel display module to said single elongate mount further comprises clamping one edge of the display cover of said panel display module between the support member and said second mounting surface on said single elongate mount.

3. The method of claim 2, wherein clamping a face of said panel display module further comprises compressing a heat-emitting element of a circuit board of said panel display module toward a heat sink.

4. The method of claim 3, wherein said compressing step comprises clamping said circuit board between the display cover of said panel display module and support member forming the heat sink to substantially uniformly compress a thermal type foam positioned between said heat sink and said heat-emitting elements.

5. The method of claim 1, further comprising:

isolating the single elongate mount from a source of vibration.

6. The method of claim 5, wherein isolating the single elongate mount from a source of vibration further comprises inserting said single elongate mount into an incompressible elastomeric mount.

7. The method of claim 1 further comprising:

coupling a second display module to said single elongate mount.

8. The method of claim 1, wherein a power supply module is mounted to the single elongate mount.

9. A method for installing an electronic sign formed of multiple display modules on a vehicle, said method comprising:

receiving the multiple display modules of the electronic sign;

mounting a single elongate mount to a vehicle, said single elongate mount having a first mounting surface and a second mounting surface, each mounting surface being in separate planes that are parallel with an axis extending the length of the elongate mount, said separate planes intersecting at an angle, said first mounting surface and said second mounting surface being operable to secure the multiple display modules of the electronic sign;

installing a first one of the multiple display modules of the electronic sign by attaching a flange extending from an edge of the first display module to the first mounting surface while compressing a front display face of the first display module along the edge against the second mounting surface of the single elongate mount;

installing a second one of the multiple display modules of the electronic sign by attaching a flange extending from an edge of the second display module to the first mounting surface while compressing a front display thee of the second display module along the edge against the second mounting surface of the single elongate mount; and connecting a power control module to the first and second display modules of the installed electronic sign.

10. The method for installing an electronic sign of claim 9, wherein the electronic sign is an LED sign.

11. The method for installing an electronic sign of claim 9, wherein the vehicle is a bus.

12. The method for installing an electronic sign of claim 9, wherein said installing is performed by one person.

13. The method for installing an electronic sign of claim 9, wherein said mounting of the elongate mount includes installing at least one isolating element and engaging the elongate mount with the at least one isolating element.

14. The method for installing an electronic sign of claim 9, wherein the power control module is mounted to a mass transit vehicle.

15. The method for installing an electronic sign of claim 9, wherein the mounting step occurs at a different step in a manufacturing process than the installing steps.

16. The method for installing an electronic sign of claim 9, wherein said mounting step is performed by an OEM and said installing steps are performed by a second entity.

17. The method for installing an electronic sign of claim 9, wherein said installing steps are performed by an entity selected from the following: a mass transit company, an OEM, and an aftermarket manufacturer.

* * * * *

UNITED STATES PATENT AND TRADEMARK OFFICE

CERTIFICATE OF CORRECTION

PATENT NO. : 7,191,506 B2 Page 1 of 1
APPLICATION NO. : 10/903428
DATED : March 20, 2007
INVENTOR(S) : James Earl Gray and John Bartholomew Gunter It is certified that error appears in the above-identified patent and that said Letters Patent is hereby corrected as shown below:

COLUMN 14, CLAIM 9, LINE 9 replace “thee” with --face--

Signed and Sealed this

Eleventh Day of September, 2007

JON W. DUDAS
*Director of the United States Patent and Trademark Office*